Patented Mar. 7, 1944

2,343,326

UNITED STATES PATENT OFFICE 2,343,326

AMINOPHENOL DERIVATIVE AND PHOTOGRAPHIC DEVELOPER CONTAINING IT

Verne H. Reckmeyer, Binghamton, N. Y., and August H. Brunner, Jr., Bel Air, Md., assignors to General Aniline & Film Corporation, New York, N. Y., a corporation of Delaware No Drawing. Original application May 20, 1941, Serial No. 394,286. Divided and this application February 20, 1943, Serial No. 476,628

5 Claims. (Cl. 95—88)

The present invention is concerned with new chemical compounds and more particularly with new derivatives of methyl amino phenols and photographic developers which contain the same.

It is well known in the photographic art that various aminophenols and polyhydroxy compounds are suitable for use as photographic developers. One of the most common of these compounds is monomethyl p-amino phenol sulphate which has been marketed under the trade name "Metol." This particular developer, however, is not too greatly soluble in aqueous sodium sulfite solutions and it is therefore impossible to prepare developing solutions of extremely high concentration which may be diluted at a later date by the user.

With this prior art in view, it is accordingly one object of the present invention to provide new derivatives of monomethyl amino phenols, which are characterized by improved solubility. A further object is to provide new derivatives of monomethyl p-amino phenol.

Another object is to provide such compounds suitable for use as photographic developers.

An additional object is the provision of photographic developers which include the new amino phenol derivatives.

Other objects and advantages of this invention will be readily apparent from the following specification.

It has now been found that the above objects are accomplished by the preparation and use of amino phenol derivatives which are reaction products of a monomethyl amino phenol with either sulphur dioxide or sulfamic acid. These new compounds are characterized by their ready solubility and are accordingly extremely suitable for the preparation of concentrated liquid photographic developers. In order that those persons skilled in the art may fully understand the nature and scope of this invention, a detailed description of the method of preparation of these new compounds and of their use in developing solutions will now be given. By way of example we shall discuss the compounds of monomethyl p-amino phenol, which have been found to be particularly advantageous and which accordingly represent the preferred form of the present invention.

The sulphur dioxide-monomethyl p-amino phenol compound is prepared by passing dry sulphur dioxide into an ether solution of monomethyl p-amino phenol. The passage of the gas is continued until precipitation is substantially complete. For example, 50 g. of monomethyl p-amino phenol sulfate are added to 175 cc. of 10% sodium carbonate. The free base or solid monomethyl p-amino phenol is then filtered off. The filtrate may be further extracted with diethyl ether and the whole amount of free base dissolved in diethyl ether. The composition is dried with anhydrous sodium sulfate. Dry sulphur dioxide is then passed into the solution until precipitation is complete. The solid is filtered, washed with di-ethyl ether, and dried over sodium hydroxide in vacuo to remove excess sulphur dioxide.

The resulting compound has a melting point of about 95° C. and decomposes at 103 to 104° C. The compound is a brownish-yellow or buff colored powder. The exact constitution of this reaction product is not definitely known although it appears that it might be designated either as monomethyl p-amino phenol N-sulfinic acid, or as the sulphur dioxide addition product of monomethyl p-amino phenol.

The sulfamic acid derivative, on the other hand, is prepared by the addition of sulfamic acid to the free base. Thus 62 g. of monomethyl p-amino phenol may be dissolved in 250 cc. of ethyl alcohol and treated with 24 g. of sulfamic acid ($H_2NSO_3H$). One gram of sodium sulfite is added in order to lighten the color and avoid oxidation and the mixture is then distilled at about 15 mm. pressure until the volume has been reduced to 100 cc. The resulting solid is then washed with dioxane. This product has a melting point of 105 to 106° C. and in general appearance resembles light tan crystals.

The corresponding compounds from monomethyl ortho amino phenol can be prepared in a substantially analogous manner.

The new derivatives prepared in the above manner are quite readily soluble in aqueous sodium sulfite solutions particularly in comparison with the previously known sulfate compound. This improved solubility in sulfite solutions is extremely surprising since the ordinary water solubility of the new compounds is substantially similar to that of the sulfate. The relative solubility may be seen from the following table which compares the solubility of the sulfate, sulfamate and sulphur dioxide addition compound or monomethyl p-amino phenol in solutions of sodium sulfite. The "para" compounds show a particularly improved solubility.

Table of solubilities

| Solvent concentration Na₂SO₃ solution | Solubility at 23° C. | | |
|---|---|---|---|
| | Mono methyl p-amino phenol SO₂ compound | Mono methyl p-amino phenol-sulfamate | Mono methyl p-amino phenol-sulfate (Metol) |
| Per cent | Per cent | Per cent | Per cent |
| 1 | 5.8 | 7.0 | 4.5 |
| 2 | 5.6 | 5.2 | 3.8 |
| 3 | 5.3 | 4.5 | 3.3 |
| 4 | 5.1 | 4.5 | 3.2 |
| 5 | 5.0 | 4.5 | 3.2 |
| 6 | 4.8 | 4.5 | 3.1 |
| 7 | 4.7 | 4.3 | 3.0 |
| 8 | 4.7 | 4.0 | 2.5 |
| 9 | 4.6 | 3.5 | 2.1 |
| 10 | 4.5 | 3.0 | 1.6 |

Because of the increased solubility of these new compounds it is possible to make up a more concentrated photographic developing solution than was hitherto possible with Metol. The concentrated solution can then be diluted by the user. In this way the volume of the solution which is sold is much smaller than would otherwise be the case and the cost of handling and shipping such a developer is therefore reduced. Suitable developing compositions according to the present invention are the following:

Formula I

Mono methyl p-amino phenol SO₂ compound _____grams__ 40
Sodium sulfite _____do____ 50
Water to make_____cc__ 1000

For use dilute with a 10% solution of sodium sulfite and develop as follows:

| Dilution | Developing time for Agfa Superpan Supreme film |
|---|---|
| 1:7 | 15 min. at 68° F. |
| 1:15 | 18 min. at 68° F. |
| 1:30 | 22 min. at 68° F. |
| 1:60 | 26 min. at 68° F. |

Formula II

Mono methyl p-amino phenol sulfamate
_____grams__ 30
Sodium sulfite _____do____ 100
Water to make_____cc__ 1000

For use dilute one part with nine parts of 10% sodium sulfite solution. Develop Agfa Superpan Supreme film about 15 min. at 68° F.

This application is a division of our copending application Serial #394,286 filed May 20, 1941.

Now therefore we claim:

1. A photographic developer containing a water soluble sulfite and as a developing agent the reaction product of a monomethyl amino phenol with a compound selected from the class consisting of sulfamic acid and dry sulphur dioxide.

2. A photographic developer containing sodium sulfite and as a developing agent the reaction product of monomethyl-p-amino phenol with a compound selected from the class consisting of sulfamic acid and dry sulphur dioxide.

3. A photographic developer containing sodium sulfite and as a developing agent the reaction product of monomethyl-p-amino phenol with dry sulphur dioxide.

4. A photographic developer containing sodium sulfite and as a developing agent monomethyl-p-amino phenol sulfamate.

5. A concentrated aqueous solution containing sodium sulfite and the reaction product of a monomethyl amino phenol with a compound selected from the class consisting of sulfamic acid and dry sulphur dioxide.

VERNE H. RECKMEYER.
AUGUST H. BRUNNER, JR.